United States Patent [19]

Avera

[11] Patent Number: 4,832,977

[45] Date of Patent: * May 23, 1989

[54] GRAVITATIONALLY-STABILIZED PEANUT-CONTAINING COMPOSITION AND PROCESS FOR MAKING SAME

[75] Inventor: Fitzhugh L. Avera, Alameda, Calif.

[73] Assignees: Jack W. Kuehn, Sr., Burnsville; Jack W. Kuehn, Jr., Minnetonka; Richard P. Kuehn, Burnsville; Robert S. Kuehn, Minneapolis, all of Minn. ; a part interest to each

[*] Notice: The portion of the term of this patent subsequent to Mar. 1, 2005 has been disclaimed.

[21] Appl. No.: 116,636

[22] Filed: Nov. 3, 1987

Related U.S. Application Data

[63] Continuation-in-part of Ser. No. 943,681, Dec. 18, 1986, Pat. No. 4,728,526.

[51] Int. Cl.$^4$ .................................................. A63L 1/38
[52] U.S. Cl. ..................................... 426/633; 426/658
[58] Field of Search ............... 426/548, 804, 633, 632, 426/658

[56] References Cited

U.S. PATENT DOCUMENTS

| | | |
|---|---|---|
| 1,398,352 | 11/1921 | Willison . |
| 1,859,206 | 5/1932 | Heisler . |
| 2,876,107 | 3/1959 | Jucaitis et al. . |
| 2,955,040 | 10/1960 | Avera . |
| 3,140,953 | 7/1964 | Roberts . |
| 3,245,803 | 4/1966 | Baker et al. . |
| 3,278,314 | 10/1966 | Colby et al. . |
| 3,580,729 | 5/1971 | Darragh et al. . |
| 3,619,207 | 11/1971 | Dzurik . |
| 3,766,165 | 10/1973 | Rennhard . |
| 3,876,794 | 4/1975 | Rennhard . |
| 3,903,311 | 9/1975 | Bullerbeck et al. . |
| 3,971,851 | 7/1976 | Fruda et al. . |
| 3,978,246 | 8/1976 | Chozianin et al. . |
| 4,042,714 | 8/1977 | Torres . |
| 4,152,466 | 5/1979 | Deretchin . |
| 4,401,682 | 8/1983 | Battista . |
| 4,477,482 | 10/1984 | Avera . |
| 4,631,195 | 12/1986 | Colliopoulos et al. . |
| 4,728,526 | 3/1988 | Avera ................................ 426/633 |

FOREIGN PATENT DOCUMENTS

| | | | |
|---|---|---|---|
| 671189 | 9/1963 | Canada ................................. | 99/176 |
| 0152455 | 9/1983 | Japan . | |

OTHER PUBLICATIONS

Pfizer Technical Information Sheet 2090 Technical Information (Mar. 1986).
Pfizer Chemical Division Sales Brochure (© 1985, Pfizer): Pfizer Polydextrose for the Market That's Shaping Up.
Pfizer Technical Data Sheets (1981–1982) re: Available Polydextrose Formulations.
Pfizer Chemical Division, © 1983, Technical Information: Polydextrose.
Reprint From Food Engineering (Jul. 1986).
Reprint From Food Processing (Aug. 1986).

*Primary Examiner*—Donald E. Czaja
*Assistant Examiner*—Carolyn Paden
*Attorney, Agent, or Firm*—Merchant, Gould, Smith, Edell, Welter & Schmidt

[57] ABSTRACT

Peanut-containing compositions and other proteinaceous plant solids and fat-containing compositions are provided which are gravitationally-stabilized with water-soluble, edible polydextrose which includes polycarboxylic acid cross-linking agents dissolved in water and acts to prevent or inhibit oil separation from the predominantly hydrophilic proteinaceous solids of the compositions. The polydextrose is dissolved in water. Methods of making these gravitationally-stabilized compositions are also provided.

59 Claims, No Drawings

GRAVITATIONALLY-STABILIZED PEANUT-CONTAINING COMPOSITION AND PROCESS FOR MAKING SAME

CROSS-REFERENCE TO RELATED APPLICATION

This application is a continuation-in-part of co-pending application Ser. No. 943,681, filed Dec. 18, 1986 and now U.S. Pat. No. 4,728,526.

FIELD OF THE INVENTION

The present invention relates to peanut containing compositions such as peanut butter, peanut spreads or spreads containing peanuts, and peanut flavoring compositions, and other proteinaceous plant solids and fat-containing compositions, which are gravitationally-stabilized to prevent or inhibit oil separation from the predominantly hydrophilic proteinaceous solids, preferably proteinaceous peanut solids, of the compositions. Methods of making the same are also provided.

BACKGROUND OF THE INVENTION

The manufacture of flavoring compositions for food products has been an important industry for many years. Natural flavors derived from vegetables, fruits, spices, and other sources have been items of commerce which are combined with other foods to provide a wide variety of tastes and textures for the consumer.

One highly desirable flavor is the flavor of fresh roasted peanuts. The peanut, or groundnut as it is often called outside the United States, is the seed or fruit of the peanut plant. It comprises a mixture of peanut oils and peanut solids. The fats or oils are primarily hydrophobic fatty materials which in combination with the substantially proteinaceous peanut solids, can provide pleasing peanut flavor and texture in food systems. Because of their hydrophobic or lipophilic nature, however, the peanut oils tends to separate from the predominantly hydrophilic peanut solids when ground peanuts are mixed in many food systems. Therefore, hydrophobic peanut oil and hydrophilic peanut solids pose a significant problem which needs to be addressed in the formulation of peanut-containing compositions, especially when peanut butter, peanut spreads or spreads containing peanuts, or other peanut-derived or peanut-containing compositions having hydrophobic peanut oil components are added to water-based foods. It will be appreciated that this same problem will exist with respect to a wide variety of food compositions containing both proteinaceous solids, preferably edible plant solids, and fats.

Because aqueous systems generally mix poorly with the hydrophobic or lipophilic peanut lipids or fats, an unstable system is generally created when aqueous systems are mixed with peanut-containing compositions. As these unstable mixtures destabilize, the hydrophobic peanut lipids and the hydrophilic peanut solids tend to separate. The tendency towards separation is called "gravitational instability." Conversely, peanut compositions whose hydrophobic and hydrophilic components resist separation are considered to be "gravitationally-stable" compositions. They are gravitationally stable because gravitational forces do not cause the denser (heavier), predominantly hydrophilic, protein-containing proteinaceous solid materials to separate from the less dense, predominantly lipophilic lipid phase constituents.

The separation of the hydrophilic and lipophilic peanut components, whether it occurs in aqueous systems or otherwise, can result in deleterious changes in the odor and flavor of the products. Undesireable changes in texture present another problem, as does the appearance of such a product, which may lessen the product's appeal to the consumer. These problems can result from both the direct physical separation of components, as well as from resulting microbiological and oxidative deterioration. As will be appreciated, the same problems exist when other substantially proteinaceous plant solids from other oil-containing plant seeds, such as flower seeds (i.e. safflower seeds and sunflower seeds), nuts or legumes are substituted for peanuts in the compositions of the present invention. Although such substitution will diminish the natural peanut flavor possessed by purer peanut products, the oil separation problem does not differ significantly. Indeed, whenever substantially proteinaceous plant solids, which are generally hydrophilic in nature, are contained in a homogeneous mixture or dispersion containing a significant amount of predominantly lipophilic fats or fat substitutes, a similar stability problem will exist. The denser proteinaceous solids will tend to settle out, allowing the fats to collect at the top of the mixture or in pockets distributed within the mixture.

One attempt to solve the problem of combining ground peanuts in food systems involves separating the peanut oil from the proteinaceous peanut solids and combining the separate solid peanut component in the food system and withholding the separated oil. The separation of peanut oil from peanut solids, however, can substantially reduce the peanut flavor.

Other attempts to solve this problem have led those skilled in the art to gravitationally stabilize the components of these products through the use of hardened fats and oils. The hardened fats and oils which are typically used are solid or semi-solid at room temperature, or have been hydrogenated or partially hydrogenated to make them so. Those skilled in the art of utilizing peanut flavor in food development, however, have shown concern for the undesireable effect these oleaginous stabilizers have on peanut flavor. While these stabilizers may lessen the development of undesirable oxidative off odors and off flavors, as well as the unacceptable textural changes due to the separation of the lipid phase, the peanut flavor can be masked by the presence of these stabilizers. Additionally, products stabilized with these oleaginous stabilizers tend to destabilize at temperatures above 30° C. when the solid and semi-solid stabilizers liquify.

Efforts to stabilize hydrophilic peanut flavorings using non-oleaginous stabilizers have also been made. Avera (U.S. Pat. No. 4,477,482) produced a gravitationally-stabilized hydrophilic peanut flavoring composition for incorporation in water-based food systems. The Avera composition is stabilized with edible polyhydroxy alcohol compounds such as sorbitol, mannitol or other cyclic or straight-chain alcohols. Although these non-oleaginous stabilizers do not appear to mask the peanut flavor as strongly as the oleaginous stabilizers do, they have flavor of their own which may detract from or diminish the natural peanut flavor.

Accordingly, a substantial need exists for a gravitationally-stabilized hydrophilic peanut-containing composition that is compatible with aqueous food systems.

Peanut flavorings are needed which resist the development of off odors, off flavors, and undesireable textural attributes, while providing a true peanut flavor. A need also exists for a gravitationally-stabilized, lipophilic, peanut-containing food product which resists the deleterious effects of phase separation cited above while effectively preserving its peanut flavor. Both of these compositions may contain constituents which are substituted for the constituents of ground peanuts. Furthermore, a general need exists for gravitationally-stabilized mixtures or dispersions containing fats and proteinaceous plant solids from a wide variety of sources other than peanuts. The ability to produce new protein rich spread products which are sufficiently gravitationally-stabilized to offer significant shelf stability may open markets for new spread products offering interesting natural and artificial flavors which are unencumbered by unwanted off flavors of unstable products or by flavor masks presented by many other gravitational stabilizers.

It will be appreciated from the foregoing that the prior art presents problems which are in need of solutions. The present invention provides solutions for these and other problems.

BRIEF DESCRIPTION OF THE INVENTION

The present invention provides a gravitationally-stabilized peanut-containing composition comprising about 25-98% by weight of ground peanuts, about 1-50% by weight of water-soluble, edible polydextrose, and about 0.5-25% by weight of added water. The polydextrose includes polycarboxylic acid cross-linking agents and is dissolved in water. The composition is a gravitationally-stabilized, pumpable, homogeneous mixture which is preferably compatible with aqueous food systems. The composition can be formed by a process comprising combining ground peanuts with an aqueous solution including polydextrose. It may also include about 0.1-10% by weight of adjuvants, such as sugar, sugar substitutes, salt, salt substitutes, preservatives, and antioxidants, coloring agents, flavoring agents, flavoring adjuncts, flavor enhancers, or mixtures thereof. The proteinaceous peanut solids and peanut oil of the present compositions may be derived separately from peanuts.

Other embodiments of the composition preferably include about 0.1-60% by weight of proteinaceous plant solids derived from seeds, nuts, or legumes other than peanuts, or mixtures thereof. Other embodiments include about 0.1-60% by weight of fats, the fats preferably including fats derived from plant sources other than peanuts, most preferably plant sources selected from the group consisting of seeds, nuts and legumes. In yet other embodiments, the composition preferably includes about 0.1-20% by weight of carbohydrate constituents approved for use in foods selected from the group consisting of bulking agents, stabilizers, suspending agents, thickeners, gelling agents, and mixtures thereof. Other embodiments preferably include synthetic sugar-fatty acid polyesters in place of a portion or all of the fats.

Another embodiment of the present invention provides a gravitationally-stabilized predominantly lipophilic peanut-containing composition comprising about 25-98% by weight of ground peanuts, about 1-10% by weight of water-soluble, edible polydextrose, and about 0.2-10% by weight of added water. The polydextrose includes polycarboxylic acid cross-linking agents and is dissolved in the water. The composition is a predominantly lipophilic, gravitationally-stabilized, pumpable, homogeneous mixture or dispersion. All of the additional constituents and/or substitutions herein disclosed may be included in alternate embodiments of this composition.

The present invention also provides a gravitationally-stabilized, lipophilic, peanut-containing composition prepared by a process comprising combining an aqueous solution comprising about 40-80% by weight of polydextrose solids with ground peanuts; and mixing the aqueous polydextrose solution and the peanuts to yield a pumpable, homogeneous, hydrophilic composition comprising about 25-75% by weight of ground peanuts, about 10-60% by weight of polydextrose, and about 2-30% by weigh of added water, wherein the polydextrose includes polycarboxylic acid cross-linking agents and wherein the polydextrose is dissolved in the water; combining said pumpable, homogeneous, hydrophilic composition with ground peanuts; and mixing the homogeneous, hydrophilic composition and said peanuts to yield a pumpable, homogeneous, gravitationally-stabilized, lipophilic composition comprising about 25-98% by weight of ground peanuts, about 1-20% by weight of polydextrose solids, and about 0.2-10% by weight of added water. The composition may also comprise about 0.1-20% by weight of adjuvants such as sugar, sugar substitutes, salt, salt substitutes, preservatives or coloring agents, or mixtures thereof. Substitutions for ground peanuts, as are described hereinbelow, may be added to the present composition to produce alternate embodiments which come within the scope of the present invention.

Another aspect of the present invention provides a method of making a gravitationally-stabilized, lipophilic, peanut-containing composition said method comprising the steps of combining an aqueous solution comprising about 40-80% by weight of polydextrose solids with ground peanuts; mixing the aqueous solution and the ground peanuts to obtain a pumpable, homogeneous, hydrophilic peanut-containing composition comprising about 25-75% by weight of ground peanuts, about 10-60% by weight of polydextrose, and about 2-30% by weight of added water, wherein the polydextrose includes polycarboxylic acid cross-linking agents and wherein the polydextrose is dissolved in the water, combining the hydrophilic composition with ground peanuts; and mixing the hydrophilic composition with the peanuts to yield a homogeneous, gravitationally-stabilized, lipophilic composition comprising a mixture of about 25-98% by weight of ground peanuts, about 1-20% by weight of polydextrose, and about 0.2-10% by weight of added water; wherein about 1.0-25% of the ground peanuts in a lipophilic composition are combined with the aqueous solution in the first combining step. In preferred embodiments of the present invention, the ground peanuts comprise ground, roasted, blanched peanuts. In other embodiments, substitutions may be made for ground peanuts consistent with other substitutions herein described.

The present peanut-containing compositions provide an even distribution of polydextrose such that the compositions consistently provide good spreadability and prevent oil bleed, while providing for a minimum of mixing to obtain this even distribution.

The polydextroses employed in the present compositions are water-soluble, synthetic, edible, undigestible, dextrose polymers which are disclosed by Rennhard in U.S. Pat. Nos. 3,876,794 and 3,766,165 to be useful as dietetic bulking agents. These polymers are produced by the melt polymerization of dextrose (D-glucose) and edible dicarboxylic acid cross-linking agents. This product has been disclosed to be useful as a noncaloric bulking agent for incorporation into dietetic food compositions.

In the compositions of the present invention, however, the dissolved polydextrose acts to gravitationally stabilize the peanut-containing compositions so that the lipophilic and hydrophilic components of the compositions will have eliminated or reduced tendencies to separate during storage or use. The usefulness of aqueous solutions of polydextrose as gravitational-stabilizing agents for food systems comprising homogeneous mixtures or dispersions including proteinaceous plant solids and fats from any of a wide variety of sources including peanuts is not known to have been heretofore publicly disclosed. The capacity of polydextrose to gravitationally-stabilize the present compositions depends upon properties of the polydextrose when solubilized or dissolved in water. It is not believed that solid polydextrose will be effective to stabilize the lipophilic fats and the predominantly hydrophilic edible proteinaceous plant solids such as the different peanut components of preferred embodiments of the present invention.

In addition, polydextrose is essentially flavorless, and so, imparts essentially no flavor of its own to the products of the present invention. Therefore, so long as the pH of the aqueous polydextrose is similar to that of the environment in which it is used, the polydextrose does not diminish the intensity or unduly alter the natural flavors of these products.

It is believed that the lipophilic composition of the present invention comprises liquid-solids system which is a protected dispersion. The problem of achieving improved gravitational stability in a peanut-containing food system having hydrophilic as well as lipophilic phases is believed to be created by the fact that these phases usually seek to present a dyneric interface wherein the hydrophilic and lipophilic phases repel one another and attempt to separate. This results in gravitational instability and, ultimately, in phase separation. In the present system, it is believed that the fundamental cause of gravitational stabilization of the peanut oil is due to a bonded solids matrix of the predominantly hydrophilic proteinacious solids connected by the polymeric polydextrose strands which are solubilized in water. This matrix, in turn, entraps the lipophilic fats, such as the peanut oils, in an aqueous dispersion. Since the dispersion is believed to exist within an aqueous phase, the composition has superior "wetability". The term "wetability" means that the composition is compatible with aqueous components or that they are easily and readily mixed with aqueous components.

This behavior is in contrast to the oil phase dispersions or suspensions which it is believed are present in peanut compositions stabilized with oleaginous stabilizers. In such products, the solid or semi-solid fatty stabilizers are believed to link the liquid peanut oils into a homogeneous network or phase that suspends the non-lipid hydrophilic solids, thereby inhibiting separation. In this process, the flavor is apparently masked by the solid and semi-solid oleaginous stabilizers. This difference in phase structure, wherein the peanut-containing and protein-containing compositions of the present invention comprise a protected dispersion in an aqueous phase rather than in a lipid phase, is believed to be at least partly responsible for the superior fullness of flavor exhibited by the lipophilic peanut compositions of the present invention. It will be appreciated that these same qualities will also be present in other embodiments comprising components from plants other than peanuts and flavors from sources other than peanuts.

Experience has shown that preparation of the gravitationally-stabilized lipophilic composition of the present invention requires more mixing than may often be desireable. This is because it is difficult to mix an aqueous solution of polydextrose with proteinaceous material such as the material found in the compositions of the present invention. A similar processing difficulty is encountered when dry protein materials are mixed with water. When such mixing takes place, the protein often clumps. This is thought to be due to the protein being wet by the water so fast that clumps develop which inhibit the even distribution of the protein in the water. In the same way, even distribution of aqueous polydextrose in peanut butter is believed to be inhibited by the proteinaceous peanut solids. The proteinaceous peanut solids are believed to be hydrated too rapidly by aqueous polydextrose mixed with large amounts of ground peanuts, thereby causing clumping of the solids and inhibiting even distribution of the polydextrose in the mixture. This results in an uneven distribution of the aqueous polydextrose wherein preferential wetting of some proteinaceous solids inhibits wetting of the remaining solids. It has been discovered, however, that an aqueous solution of polydextrose can be combined and mixed with an amount of ground peanuts which is less than that contained in the lipophilic composition of the present invention, to form a hydrophilic composition. The hydrophilic composition can then be subsequently combined and mixed with more ground peanuts to form the lipophilic product of the present invention having an even polydextrose distribution.

On the other hand, when an aqueous solution of polydextrose is combined and mixed with large amounts of proteinaceous material, the mixture may initially clump such that the polydextrose and the added water from the aqueous solution are not evenly mixed with the proteinaceous material until the mixture is mixed for a considerable period of time. Because it may be desireable to limit the amount of mixing which is required, and because it is important to obtain an evenly mixed composition, the method of the present invention offers advantages over simple mixing of the aqueous polydextrose with ground peanuts.

It is important to obtain an even mixing of the aqueous solution of polydextrose with the ground peanuts because an uneven distribution, wherein some portions contain more and other portions contain less aqueous polydextrose, can result in portions which contain too little polydextrose and are, therefore, subject to "oil bleeding" because there is insufficient aqueous polydextrose to gravitationally-stabilize the composition in these areas. Other portions can simultaneously have too much aqueous polydextrose which can harden the product and undesireably reduce spreadability. These problems can be avoided if the mixing is adequate enough to obtain an even distribution of the aqueous polydextrose within the lipophilic composition. Spreadability is an important attribute to some compositions of the present invention, such as those which may otherwise qualify as peanut butter under Federal Standards which require peanut butter to be capable of being spread on fresh white bread without tearing the bread.

It will be appreciated, however, that it is not desirable to extensively mix flavor-containing food systems such as the lipophilic peanut-containing composition of the present invention. In fact, the less mixing involved in the process of making the present composition the better. This is because mixing is believed to allow volatile aromatic constituents of the ground peanuts to escape. These volatile constituents are believed to be important components of the flavor provided by the peanuts. It is believed that the more mixing there is, the more flavor that will be lost. In addition, the more mixing there is, the more air that can be incorporated into the mixture by intrainment and by dissolvement. Additional air incorporation is undesirable because it may result in an increase in deleterious oxidative reactions which generally occur in this type of composition. Furthermore, mixing generates heat. It is believed that for every degree of increased temperature generated in the mixture, there is an exponential rise in the number of oxidative reactions which occur. It is considered to be undesireable to encourage these oxidative reactions to occur, because they are believed to generate rancid and stale flavors which are undesireable and often unacceptable to consumers. In addition, it is believed that too much mixing can separate out materials having different densities, wherein heavier materials, materials having greater density, will gradually gravitate to the bottom of an over mixed batch of independents. Furthermore, the more mixing that is required, the more money that will be required to pay for the mixing time, the energy expenditure, the labor costs, or sophisticated mixing equipment required to do an adequate job of mixing where more mixing is involved.

Fortunately, it has been discovered, and is disclosed herein as an aspect of the present invention, that it is easier to rapidly mix a small amount of ground peanuts in a large amount of aqueous polydextrose than it is to mix a large amount of ground peanuts in a small amount of aqueous polydextrose. In the latter case the aqueous polydextrose quickly associates with a portion of the total amount of ground peanuts and subsequently becomes difficult to mix. In the former case, there is more than enough aqueous polydextrose to associate evenly throughout the mixture without requiring excessive mixing. Once the initial mixture of aqueous polydextrose and peanuts is obtained, a larger amount ground peanuts can be combined and mixed with the initial mixture in a relatively straightforward manner which allows even mixing without requiring an undue amount of mixing. It will be appreciated that this will also be true for mixtures including aqueous polydextrose and other edible proteinaceous plant solids which may be substituted for the solids component of ground peanuts.

The terms "hydrophobic" and "hydrophilic" are widely-used terms describing the respective natures of materials which resist dispersion in water, and materials which mix readily with water. A "hydrophobic" material generally exhibits an affinity for "lipophilic" systems. As used herein, "lipophilic" and "hydrophobic" are interchangeable terms. Each of these terms are used in a general sense and are not intended to mean that every aspect of a composition is either "hydrophilic" or "lipophilic", but rather that these compositions are generally or predominantly one or the other, and generally exhibit characteristics which are considered to be one or the other. All percentages (%) in this specification regarding aspects of the present invention, denote "% by weight", which is also denoted by "wt-%". In the case of polydextrose, weight percentages of solid polydextrose are given. The terms "aqueous polydextrose" and "dissolved polydextrose" refer to polydextrose which has been solubilized or dissolved in water. In addition, the term "aqueous system" is intended to refer to a liquid system having water as its primary solvent. When used in regard to ground peanuts, the term "unextracted" means that the inherent oil in the peanuts has not been extracted, but is present in the ground peanuts. Ground peanuts inherently include peanut oil or fat and proteinaceous peanut solids which include both protein and carbohydrate components of peanuts. "Fats" mean edible fatty materials, oils and lipids of all kinds which may include fatty acids, mono-, di-, triglycerides, and the like, as well as edible fat-like fat substitutes containing fatty constituents such as fatty acids and the like. "Proteinaceous" plant or peanut "solids" are the edible plant materials which remain after they have been processed to remove fats or oils. They generally contain a substantial amount of protein and a significant amount of carbohydrate material, including fiber as well as having an ash component and some moisture content. Preferably, "proteinaceious solids" are primarily protein. As used herein, "plant protein" means edible protein material derived from plant sources, or microbial sources, or protein of a synthetic derivation patterned after protein from plant or microbial sources. As used herein, "undigestible" is intended to refer to a substance which is non-toxic, but is generally undigestible by humans and so is not nutritive thereto. "Edible" means that a person may ingest it in appropriate amounts without suffering any ill effects, but "edible" does not indicate that something is necessarily digestible. "Calorie-free" means providing essentially no dietary calories, or edible but undigestible. The term "added water" is used to designate water which has been added to or combined with other constituents, such as the ground peanuts, and it does not include water which is contained in those constituents if any water is indeed present therein. Water incorporated in "aqueous polydextrose", i.e. Type N Polydextrose (Pfizer Chemical, New York, N.Y.) which is about 30% by weight water, is considered to be "added water", with respect to the compositions of the present invention. A "pumpable" composition is one which may be pumped, and which flows when it is pumped, a pump-flowable composition. A "spreadable" composition is one which may be spread with a butter knife.

The above described features and advantages along with various other advantages and features of novelty are pointed out with particularity in the claims of the present application and are further described in the Detailed Description which follows.

DETAILED DESCRIPTION OF THE INVENTION

The compositions of the present invention comprise food materials such as ground peanuts, nuts or legumes, which contain proteinaceous solids and fats, and an effective, gravitationally-stabilizing amount of an aqueous solution of an edible, undigestible polydextrose. Included among these compositions are peanut butter, peanut spreads, nut butters, nut spreads, flavorbased products and the like.

Peanuts, peanut fragments, and ground, roasted and/or blanched peanuts are articles of commerce and are commonly available commodity products. A preferred peanut ingredient is ground roasted peanuts, and a most preferred peanut ingredient is ground roasted blanched peanuts for reasons of optimal flavor, texture and appearance. All of these products are preferably used with essentially all of their peanut oil. Peanuts generally comprise about 40–50% peanut oil and about 50–60% proteinaceous peanut solids including about 20–35% protein. Ground roasted peanuts without peanut skins generally contain about 40–60% fats, about 20–35% protein, about 0.5–5% water, about 1–4% ash, and about 15–20% carbohydrates including about 1–4% of the total fiber. Preferred ground roasted peanuts contain 50.2% fat, 27.3% protein, 18.2% carbohydrates, 2.4% ash, and 1.8% water. It is possible to make the equivalent of the ground peanuts used in the present invention by adding oil to extracted peanut meal or proteinaceous peanut solids, but it is thought that this can result in substantial flavor loss and is not, therefore, a preferred ingredient for incorporation in the compositions of the present invention, although it is provided for, and is within the scope of the present invention.

The peanut compositions of the present invention may be made using edible proteinaceous plant solids from other plant materials, preferably nuts or legumes, as substitutes for the proteinaceous peanut solids from peanuts. Furthermore, various fats or lipid materials from various sources, including natural and synthetic edible fatty materials may be substituted for peanut oils which are inherent in ground peanuts. Edible fats or fatty materials are preferably derived from flower seeds, such as sesame seeds, safflower seeds, sunflower seeds and the like, nuts and legumes. Decorticated (dehulled), toasted sesame seeds having less than about 2% moisture content generally contain about 45–65% fat, about 10–30% protein, about 10–30% carbohydrates, and about 2–8% ash. Preferred decorticated, toasted sesame seeds having about 1.9% moisture content contain about 55.4% fat, 18.9% protein, 18.3% carbohydrates, and 5.5% ash.

Other edible fats or fat-like materials useful in the present compositions include non-caloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other useful fats are medium chained triglycerides, highly esterified polyglycerol esters, acetin fats, plant sterol esters, polyoxyethylene esters, jojoba esters, mono-diglycerides of fatty acids, and mono-diglycerides of short-chain dibasic acids. Sources for fats include all appropriate food sources normally used to produce food fats. Among these sources are seeds such as grape seed, sesame seed, sunflower seed, safflower seed, corn, and the like, various nuts, coconut, and various legumes. Sources for oil include all of the oil-bearing seeds, nuts and legumes disclosed below as sources for proteinaceous plant solids. Fat-like materials useful in the present invention also include sugar fatty-acid polyesters or sugar alcohol fatty-acid polyesters preferably having at least four fatty-acid ester groups, with each fatty-acid preferably having 8–22 carbon atoms (i.e. Olestra ®, which is being developed by the Proctor & Gamble Co., Cincinatti, Ohio). Such polyesters and their use in conventional food products have been disclosed by Mattson et al. (U.S. Pat. No. 3,600,186), the disclosure of which is incorporated herein by reference.

Sources for edible proteinaceous plant solids which may be substituted for proteinaceous peanut solids in the present invention can include cashews, pistachio nuts, walnuts, coconut meal, Brazil nuts, almonds, hazel nuts, Macadamia nuts, pecans, hickory nuts, sesame seeds, grape seeds, sunflower seeds, safflower seeds, soybeans, acorns, locust beans, beech nuts, chestnuts, sal-nuts (ginkgo), hackberries, guiana-nut, wingnut, beans generally, and the like. It will be appreciated that large percentages of edible proteinaceous plant solids from these plant materials may be substituted for proteinaceous peanut solids in the peanut compositions of the present invention. Furthermore, it will be appreciated that the various oils which are commonly used in food products, some of which are listed herein, may be substituted for peanut oils in the present peanut-containing compositions. In addition, it will be appreciated that, although the present invention is directed primarily toward gravitationally-stabilized peanut-containing compositions, the subject matter of the present invention also includes gravitationally-stabilized compositions containing a wide variety of edible proteinaceous plant solids and a wide variety of edible fats from various sources, including plant fats and synthetic fats as disclosed hereinabove. The present invention is by no means limited to the gravitational stabilization of peanut-containing compositions, but rather includes gravitationally-stabilized compositions containing a wide variety of edible plant materials which mix proteinaceous plant solids with fats. All such compositions have the problem of oil separation and gravitational instability. The applicants have discovered that aqueous polydextrose can be used to gravitationally stabilize all such products.

Polydextrose is an edible but undigestible, synthetic dextrose polymer which has been used as a non-caloric bulking agent in dietetic food compositions. Polydextroses useful in the present composition are disclosed in U.S. Pat. Nos. 3,766,165 and 3,876,794 which are incorporated herein by reference. These non-utritive carbohydrate substitutes are prepared by polycondensation or melt polymerization of dextrose in the presence of edible polycarboxylic acid cross-linking agents under conditions of reduced pressure. Optionally, polyol plasticizers such as sorbitol, glycerol, mannitol or the like, may be added to the reaction mixture to produce less rigid polymers of lower viscosity.

In general, useful polydextroses can be considered to be randomly-bonded condensation polymers of D-glucose (dextrose) which incorporate about 0.5–10 mole percent of polycarboxylic acid esters and about 5–20% by weight of a food-acceptable polyol in addition to the dextrose. It will be appreciated that other monosaccharides, such as galactose, mannose or other hexoses; maltose or other disaccharides; or mixtures thereof, may be substituted for dextrose in preparing this polycondensation product, so long as they do not change the nature of the product as a whole. The sugars supplied to the reaction mixture are supplied as dry anhydrides or dry hydrated solids in powder form. A wide variety of edible polycarboxylic acids may be used to cross-link the saccharide molecules, including citric acid, fumaric acid, tartaric acid, succinic acid, adipic acid, itaconic acid, malic acid and the like, or mixtures thereof. Among the food-acceptable polyol plasticizers which may be incorporated are sorbitol, glycerol, erythritol, xylitol, mannitol, galacitol, and the like, or mixtures thereof.

The melt polymerization process disclosed to be used to make the polydextroses used in the present invention involves combining the dry powdered glucose with the edible polycargoxylic acid cross-linking agent, and, optionally, the food-acceptable polyol plasticizing agent, and heating the mixture under reduced pressure, preferably below about 300 mm Hg, until the mixture melts. The molten mass is maintained at a constant temperature and pressure in the absence of water until substantial polymerization has taken place. During this process, the polycarboxylic acids cross-link the glucose moieties to produce a variety of randomly-bonded polyglucose polymers, wherein the 1-6 linkage predominates. The polyglucose molecules can be formed in a wide variety of molecular weight ranges, but typically exhibit a number average molecular weight of about 1,500–18,000.

When copolymerized with the dextrose and the polycarboxylic acid, the polyol plasticizers partially replace the dextrose moieties, and are integrally incorporated into the polymeric chains.

Three preferred forms of polydextrose, any of which may be used in the present invention, either alone or in combination, are available from Pfizer Chemical Division, New York, N.Y. These products are Polydextrose (S6810), Polydextrose Type N (70% solution) (S6811), and Polydextrose K. All three of these products are polycondensation products of dextrose, sorbitol and citric acid. Polydextrose S6810 is a water-soluble, dry powder which exhibits a pH of 2.5-3.5 in aqueous solution. It does not have any flavor or odor other than its acid character. It is soluble in water up to about an 80% by weight polydextrose solids solution. Polydextrose Type N is produced as a viscous, clear aqueous solution of partially neutralized polydextrose containing about 70% by weight polydextrose solids. It is neutralized with potassium hydroxide and exhibits a pH range of about pH 5.0-6.0. Polydextrose K is a dry solid powder which has been neutralized with potassium bicarbonate. It is soluble in water up to about an 80% by weight polydextrose solids solution, and has a pH in solution of about pH 5.0-6.0. These commercially available products may contain unpolymerized edible by-products of the condensation reaction process in minor amounts.

The polydextrose must be solubilized in the aqueous phase of the present compositions in order to effectively stabilize them. Preferably, the polydextrose is solubilized in water before it is mixed with the ground peanuts in formulating the present compositions. A pre-formed aqueous solution of polydextrose can be used, such as Polydextrose Type N from Pfizer. When solid polydextrose is solubilized in water prior to incorporation in the present compositions, the aqueous solution can comprise about 40-80%, preferably about 50-80%, and most preferably about 60-80% polydextrose.

Sugar or carbohydrate sweeteners that can be used in making the novel peanut-containing composition of the present invention include commonly available mono- and disaccharide sweeteners, including fructose, glucose, sucrose, honey, invert sugar, and the like, or mixtures thereof. Artificial sweeteners such as L-aspartyl-L-phenylalanine methyl ester or aspartame (available as Nutrasweet TM from the G. D. Searle Co., Chicago, Ill.), and saccharin, available as an alkali metal salt such as sodium saccharin, may also be added to the compositions of the present invention. A preferred sugar sweetener comprises a mixture of invert sugar and sucrose for reasons of blendability and cost.

An effective amount of other adjuvants may also be added, such as salt (NaCl) or salt substitutes such as potassium chloride and the like, preservatives or antimicrobial agents such as benzoate and propionate salts, and the like, antioxidants such as BHA, BHT, Ascorbic Acid and the like, coloring agents approved for use in foods, such as carmel, anatto and the F.D.&C. colorants and the like, flavoring agents, flavor enhancers, flavoring adjuncts, or other ingredients included to enhance the stabilized compositions of the present invention with regard to flavor, appearance, and stability with respect to bacteria or mold, and the like. Any ingredient commonly used in food systems may be included in embodiments of the present invention. An enumeration of certain of these ingredients is presented in *Food Chemicals Codex*, 2d Ed., 1972, which is incorporated herein by reference.

The compositions of the present invention may also include preferably about 0.1-20% by weight, preferably about 0.1-15% by weight, more preferably about 0.1-10% by weight, of carbohydrate constituents approved for use in foods selected from the group consisting of bulking agents, stabilizers, suspending agents, thickeners, gelling agents, and mixtures thereof. An enumeration of certain of these ingredients is also presented in *Food Chemicals Codex*, 2d Ed., 1972. These carbohydrate constituents include glycerin, methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, propylene glycols, locust bean gum, methyl ethyl cellulose, maltodextrose pectin, polysorbates, poloxamers, edible alcohols, tragacanth, and the like. The present compositions may also include about 0.1-30% by weight, preferably about 0.1-15% by weight, more preferably about 0.1-10% by weight, of food grade polyhydric alcohol selected from the group consisting of glucose, fructose, sucrose, mannose, dextrose, sorbitol, mannitol, and the like.

The present invention provides for a wide variety of gravitationally-stabilized compositions, preferably peanut-containing compositions. These compositions may contain a wide variety of constituents. They have in common the need to gravitationally-stabilize proteinaceous solids and fats included in the constituents of the compositions. This gravitational stabilization is accomplished by including an amount of a water-soluble, edible, polydextrose and added water, the polydextrose being dissolved in the added water. For instance, one embodiment of the present invention provides a gravitationally-stabilized hydrophilic protein-containing composition comprising about 5-40, preferably about 10-30% by weight edible plant proteins, about 5-60, preferably about 10-50, more preferably about 15-40% by weight of edible fats, about 2-30, preferably about 5-25, more preferably about 10-20% by weight carbohydrates, about 1-50, preferably about 2-40% by weight polydextrose, and about 0.5-25, preferably about 1-20% by weight added water, wherein the composition is a gravitationally-stabilized, pumpable, homogeneous mixture. The polydextrose preferably includes polycarboxylic acid cross-linking agents, and is preferably dissolved in the added water. Preferably, the mixture is compatible with aqueous food systems. In a preferred embodiment, the proteins include proteins from nut or legume sources, or mixtures thereof, and the fats preferably include fats from plant sources including plant seeds, nuts, or legumes, preferably nuts or legumes, or mixtures thereof. A preferred embodiment includes peanut proteins and fats from peanuts. Alternate embodiments also include edible carbohydrates from various sources, preferably including plant sources. Other carbohydrates, preferably including sugar selected from the group consisting of glucose, fructose, sucrose, mannose, dextrose, sorbitol, mannitol, invert sugar and the like may be substituted for a portion of the polydextrose in alternate embodiments, and thereby provide some gravitational stabilization effective to allow the amount of polydextrose to be reduced. In other embodiments, a portion of the carbohydrates included in the composition which would otherwise be present as a component of edible proteinaceous plant solids may be supplanted by the use of constituents approved for use in foods selected from the group consisting of bulking agents, stabilizers, suspending agents, thickeners, gelling agents, and the like.

The present invention also provides a method of gravitationally stabilizing a protein-containing composition including about 5–40, preferably about 10–30% by weight edible plant proteins, about 5–60% by weight edible fats, and about 2–30% by weight edible carbohydrates. The method comprises mixing an aqueous solution including food grade polydextrose with the preferably lipophilic protein-containing composition such that the composition is a gravitationally-stabilized, pumpable, homogenous mixture. The mixture includes about 1–50% by weight polydextrose, and about 0.5–25% by weight added water. The plant proteins preferably include proteins from nuts, legumes, or a combination thereof. Preferably, the proteins include peanut proteins and the fats include fats from peanuts. The carbohydrates preferably include carbohydrates from plant sources, although it is within the scope of the present embodiment to include any of the constituents disclosed herein.

A gravitationally-stabilized predominantly lipophilic protein-containing composition is also provided, comprising about 10–60% by weight edible plant proteins, about 5–70% by weight edible fats, about 2–40% by weight edible carbohydrates, about 1–20% by weight edible polydextrose and about 0.2–10% by weight added water, wherein the composition is a gravitationally-stabilized, pumpable, homogenous mixture. The polydextrose includes polycarboxylic acid cross-linking agents and is dissolved in water. In alternate embodiments, any of the substitutions or limitations disclosed herein may be included. A method of gravitationally-stabilizing such a composition is also provided.

Hydrophilic Peanut-Containing Flavoring Composition

The hydrophilic peanut-containing flavoring composition, having compatibility with aqueous food systems, comprises an amount of unextracted ground peanuts which is effective to provide a peanut flavor, and an amount of dissolved polydextrose effective to gravitationally stabilize the composition. A preferred embodiment of the composition contains ground roasted blanched peanuts. The hydrophilic peanut-containing flavoring composition comprises about 20–80, preferably about 25–75, more preferably about 30–60, and most preferably about 40–50% by weight ground peanuts. Less than about 40% peanuts will begin to produce a flavoring composition with a flavor which is insufficient to satisfy most consumers, but other flavors, flavor enhancers and flavor adjuncts can be used to provide products which consumers may find desireable. This composition is preferably compatible with aqueous food systems. At greater than about 50% of peanuts, the flavoring composition may begin to lose its compatibility with aqueous foods, but will still be useful in many respects.

The composition further comprises about 10–60, preferably about 20–55, more preferably about 30–50% by weight of polydextrose which is preferably solubilized in water prior to incorporation in the present composition. The composition further comprises about 2–30, preferably about 5–25, more preferably about 7.5–20% by weight of added water in which the polydextrose is dissolved. The composition may optionally comprise about 0.1–10.0% by weight of adjuvants such as sugar or sugar substitutes, salt or salt substitutes, coloring agents, edible antimicrobial agents or other desirable food additives or flavor potentiators known in the art. A preferred embodiment of the composition contains about 0.1–2.0% salt (NaCl) and/or salt substitutes, preferably about 0.5–1.5% salt or salt substitutes. Consistent with the disclosure hereinabove, other constituents may be substituted for all or some of then constituents of this composition and still result in a composition which falls within the scope of the present invention.

The individual components of the novel peanut flavoring can be combined in any order to form the peanut-flavoring composition of the present invention. The components are typically combined in a process which comprises first solubilizing the polydextrose component in the water, or using a pre-formed aqueous solution of polydextrose, and then mixing any adjuvants in the aqueous polydextrose solution until a homogeneous mixture results. Finally, this mixture, including the aqueous polydextrose solution, is added to the ground peanuts and mixed until the mixture is homogeneous.

The hydrophilic flavoring compositions of this invention can be used in essentially any food composition, dry mix, or protein concentrate in which peanut flavoring is desirable. Such food systems include peanut-flavored candies, peanut-flavored chips; peanut-flavored syrups; soft drinks; instant drinks; breakfast combinations (hot or cold); gelatins; puddings; yogurts; pastries such as bread, pies, cakes, brownies, doughnuts, turnovers, sandwiches, breads, rolls, dry mixes, etc.; frozen confections such as popsicles, snow cones, sherbets, frozen yogurts, soft serve; jams, jellies; soups; ice creams such as peanut-flavored ice cream, chocolate peanut-flavored ice cream, banana peanut-flavored ice cream, etc.; candies such as peanut-flavored cream chocolates, peanut-flavored coconut bars, etc.; liquors and cordials; and the like. The hydrophilic composition when freshly made is a flowable, highly pumpable composition which is easy to handle. These compositions can also be used in non-food areas such as in producing pleasant scent, in masking the unpleasant flavor of medicine or in hiding the odor or flavor of pest control agents. The flavoring compositions described in Example II below, may be used in acidic pickled products such as relish, pickles and other acidic or acidulated food products.

Lipophilic Peanut-Containing Composition

The predominantly lipophilic peanut-containing composition comprises about 25–98, preferably about 40–97.5, more preferably about 60–97, even more preferably about 80–96% by weight ground peanuts, about 0.5–20, preferably about 1.0–10, more preferably about 2.0–8.0% by weight of polydextrose, and about 0.1–15, preferably about 0.2–10, more preferably about 0.5–8% by weight of added water. Preferably, the lipophilic composition comprises about 2.0–8.0%, most preferably about 2.5–8.0% polydextrose, as well as, about 0.5–8.0%, more preferably about 0.5–5.0%, wherein the polydextrose is preferably dissolved in the water prior to incorporation in the present composition. The lipophilic composition may comprise about 0.1–5.0% of other edible adjuvants used in the hydrophilic peanut-containing composition described hereinabove, such as sugar and/or sugar substitutes, salt or salt substitutes, edible antimicrobial agents, food coloring agents, and other desireable food additives or flavor potentiators known in the art. In the most preferred embodiments, the ground peanuts are unextracted ground, roasted, blanched peanuts including their peanut oil.

A preferred embodiment of the predominantly lipophilic peanut-containing composition of the present invention comprises about 90–98, preferably about 90–96% by weight ground peanuts, about 1.0–10% polydextrose, and about 0.2–10% added water. Preferably, the predominantly lipohlic composition comprises about 2.0–8.0% polydextrose, as well as about 0.5–8.0%, more preferably about 0.5–5.0% added water, wherein the polydextrose is preferably dissolved in the water prior to incorporation in the compositions.

The lipophilic peanut-containing composition of the present invention may preferably qualify for classification as a peanut butter under the Federal Standards of Identity for Peanut Butter (21 CFR § 164.150). It can be a smooth or crunchy-style peanut butter. Both of these products are considered to be homogeneous within the context of the present invention, since the components are evenly distributed throughout. Certain embodiments, as they regard the percentage of ground peanuts and polydextrose for the lipophilic composition, are designed to be encompassed by the Federal Standards of Identity for Peanut Butter.

The invention will be further described by reference to the following detailed examples.

EXAMPLE I

Hydrophilic Composition

Into a one quart stainless steel mixing bowl was placed 41.58 parts by weight of roasted, blanched and ground peanuts, at a temperature of 74° C. To this was added 0.42 parts by weight of salt. The mixture was then subjected to low shear mixing action until it was relatively homogeneous. Then 58 parts by weight of aqueous Type N Polydextrose (Pfizer Chemical Division, New York, N.Y.) (70% polydextrose solids) was added at room temperature. Mixing was continued at low to moderate shear mixing action. This was continued until a smooth product of pleasant peanut flavor was produced. The product was hydrophilic in nature and was gravitationally-stable indefinitely at room temperature. It is estimated that this composition contains 10.5% peanut protein, 20.5% fat, 8.0% carbohydrates, 1.6% ash, 18.3% water including 17.4% added water, and 40.6% polydextrose.

EXAMPLE II

Hydrophilic Composition With Acidic Character

Into a one quart stainless steel high shear mixing blender was placed 30 parts by weight of water at 74° C. To this, 70 parts by weight of solid polydextrose powder (Solid Polydextrose (S6810), Pfizer Chemical Division, New York, N.Y.) was gradually added under high shear mixing conditions. Blending and solubilization produced a viscous but pourable smooth liquid. The mixture was allowed to stand until the air bubbles escaped. In another one quart stainless steel mixing bowl was placed 42 parts by weight of roasted, blanched and ground peanuts. To this was added 58 parts by weight of the 70% polydextrose preparation prepared in the first step above. This mixture was blended with low to moderate shear mixing action until smooth and homogeneous. The product had the same physical appearance and separation resistance present in the product describe in Example I above. It was hydrophilic in nature and, in contrast to the product of Example I, had an acidic rather than a relatively neutral character. At room temperature, the product was gravitationally stable indefinitely. The only flavor detectable in this product was that of peanuts. It is estimated that this composition contains 11.5% protein, 21.2% fat, 7.6% carbohydrates, 1.0% ash, 18.2% water including 17.4% added water, and 40.6% polydextrose.

EXAMPLE III

Lipophilic Composition

The following ingredients were mixed with low to medium shear mixing action in a one quart stainless steel mixing bowl at 73° C. until a homogeneous mixture resulted: 91 parts by weight of unextracted, roasted, blanched and ground peanuts; and 1 part by weight salt. To that mixture 8 parts by weight of a concentrated aqueous solution of Type N Polydextrose (Pfizer Chemical Division, New York, N.Y.) (70% polydextrose solids) at room temperature was added. The mixing action was continued until a smooth homogeneous mixture resulted. A smooth pumpable product resulted which was gravitationally stable indefinitely under ambient storage conditions. It is estimated that this composition contains 24.8% protein, 45.7% fat, 16.6% carbohydrates, 2.2% ash, 4.0% water, including 2.3% added water, and 5.6% polydextrose.

EXAMPLE IV

Lipophilic Composition

Into a on quart stainless steel mixing bowl is placed 41.58 parts by weight of ground, roasted, peanuts, at a temperature of 74° C. To this is added 0.42 parts by weight of salt. The mixture is then subjected to low shear mixing action until it is relatively homogeneous. Subsequently, 58 parts by weight of aqueous Type N Polydextrose (Pfizer Chemical Division, New York, N.Y.) is added at room temperature. Mixing is continued at low to moderate shear mixing action until a smooth, homogenous, hydrophilic, gravitationally-stabilized peanut-flavored composition was produced.

Into a second stainless steel mixing bowl (four quart) 92% by weight ground, roasted peanuts are placed and subjected to low to medium shear mixing action at 73° C. until a homogeneous mixture results. To that mixture, 12% by weight of the hydrophilic, gravitationally-stabilized, peanut-flavored composition prepared hereinabove is added at room temperature. The mixture is then mixed continuously with low shear mixing action until a smooth, pumpable, homogeneous, lipophilic, gravitationally-stabilized, peanut-containing composition results. It is estimated that this composition contains 25.4% protein. 46.6% fat, 16.9% carbohydrates, 2.2% ash, 3.7% water including 2.1% added water, and 4.9% polydextrose.

EXAMPLE V

Hydrophilic Composition

Into a controlled temperature oven are introduced decorticated sesame seeds which are then toasted at 74° C. until test aliquots are removed having less than two (2) weight-percent of residual moisture. The dried and toasted sesame seeds are then placed in a high shear mixer until a homogeneous seed butter is produced which is similar in consistency to freshly ground roasted peanuts. An aliquot of the seed butter consisting of two (2) parts by weight of a final mixture is then mixed under low shear conditions in a one quart stainless steel mixing bowl with 39.58 parts by weight ground roasted and blanched peanuts which are approximately 74° C. in temperature. The sesame seeds add the flavor of toasted sesame and, perhaps more importantly, have an antioxidant effect upon oils. To this mixture is added 0.42 parts by weight salt under low shear mixing conditions. Subsequently, 58 parts by weight of aqueous Type N Polydextrose (Pfizer Chemical, New York, N.Y.) at room temperature is slowly added to the foregoing mixture under low shear mixing conditions until a smooth, homogeneous, hydrophilic, gravitationally-stabilized peanut-sesame-flavored composition is produced and wherein the sesame seed butter component contributes to the mass gravitational stability, the oxidative stability, as well as the flavor of the composition. It is estimated that this composition contains 10.8% protein, 21.4% fat, 7.6% carbohydrate, 1.0% ash, 18.2% water including 17.4% added water, and 40.6% polydextrose.

EXAMPLE VI

Hydrophilic Composition

At room temperature into a one quart stainless steel mixing bowl is placed four (4) parts by weight of maltodextrose (Maltrin® M-100, Grain Processing Corp., 1600 Oregon St., Muscatine, Iowa 52761). To this is added 6 parts by weight of water. This is mixed under medium shear conditions until a smooth, clear mixture is attained. To this mixture is teen added 48 parts by weight aqueous Type N polydextrose. Mixing is continued until a smooth homogeneous mixture is produced. To this mixture there is then slowly added, under low shear conditions, 41.58 parts by weight of ground, roasted, blanched peanuts at 7020 C. When the mixture is relatively homogeneous, 0.42 parts by weight sodium chloride is added and mixing is continued to the point of even salt distribution, and then stopped. The product is predominantly hydrophilic in nature, and provides increased gravitational stability at room temperature. It is estimated that this composition contains 10.5% protein, 20.5% fat, 12.0% carbohydrate, 1.6% ash, 24.3% water including 23.4% added water, and 40.6% polydextrose.

EXAMPLE VII

Lipophilic Sesame-Containing Composition

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Ninety-two (92) parts by weight of these ground, toasted sesame seeds are mixed with 8 parts by weight aqueous Type N Polydextrose (Pfizer Chemical, New York, N.Y.) at room temperature under low shear mixing conditions until a smooth, spreadable, pumpable, homogeneous, gravitationally-stabilized composition is produced. It is estimated that this composition contains 17.4% protein, 51.0% fat, 16.8% carbohydrate, 5.0% ash, 4.1% water including 2.4% added water, and 5.6% polydextrose.

EXAMPLE VIII

Hydrophilic Sesame-Containing Composition

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Forty-eight (48) parts by weight of these ground, toasted sesame seeds are mixed with 52 parts by weight aqueous Type N Polydextrose (Pfizer Chemical, New York, N.Y.) at room temperature under low shear mixing conditions until a smooth, pumpable, homogeneous, gravitationally-stabilized composition is produced. It is estimated that this composition contains 9.1% protein, 26.6% fat, 8.8% carbohydrate, 2.6% ash, 16.5% water including 15.6% added water, and 36.4% polydextrose.

EXAMPLE IX

Hydrophilic Sesame-Containing Composition

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Forty-eight (48) parts by weight of these ground, toasted sesame seeds are mixed with 40 parts by weight aqueous Type N Polydextrose (Pfizer Chemical, New York, N.Y.), 5 parts by weight invert sugar, and 7 parts by weight Maltodextrose (Maltrin® M-100, Grain Processing Corp, Muscatine, Iowa) at room temperature under low shear mixing conditions until a smooth, pumpable, homogeneous, gravitationally-stabilized flavoring composition is produced. It is estimated that this composition contains 9.1% protein, 26.6% fat, 20.8% carbohydrate, 2.6% ash, 12.9% water including 12.0% added water, and 28% polydextrose.

EXAMPLE X

Lipophilic Sesame-Containing Composition

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Sixty-four (64) parts by weight of these ground, toasted sesame seeds are mixed with 8 parts by weight aqueous Type N Polydextrose (Pfizer Chemical, New York, N.Y.), 14 parts by weight Maltodextrose (Maltrin® M-100, Grain Processing Corp. Muscatin Iowa), and 14 parts by weight safflower oil at room temperature under low shear mixing conditions until a smooth, spreadable, homogeneous, gravitationally-stabilized sesame flavored spread composition is produced. It is estimated that this composition contains 12.1% protein, 49.5% fat, 25.6% carbohydrate, 3.5% ash, 3.6% water including 2.4% added water, and 5.6% polydextrose.

EXAMPLE XI

Hydrophilic Sesame-Peanut Containing Composition

Decorticated or dehulled sesame seeds are toasted at 74° C. until residual mositure is reduced to less than 2% by weight. The dried and toasted sesame seeds are placed in a high shear mixer until a homogenous mixture is produced which is similar in consistency with freshly ground roasted peanuts. Eighteen (18) parts by weight of these ground, toasted sesame seeds are mixed with 30 parts by weight ground roasted peanuts, 40 parts by weight aqueous Type N polydextrose (Pfizer Chemical, New York, N.Y.), 5 parts by weight invert sugar, and 7 parts by weight at room temperature under low shear mixing conditions until a smooth, pumpable, homogeneous, gravitationally-stabilized flavoring composition is produced. It is established that this composition contains 11.2% protein, 24.5% fat, 20.8% carbohydrate, 2.6% ash, 12.9% water including 12.0% added water, and 28% polydextrose.

EXAMPLE XII

Lipophilic Sesame Peanut-Containing Composition

Decorticated or dehulled sesame seeds are toasted at 74° C. until residual moisture is reduced to less than 2% by weight. The dried and toasted sesame seeds are placed in a high shear mixer until a homogeneous mixture is produced which is similar in consistency with freshly ground roasted peanuts. Twenty-four (24) parts by weight of these ground, toasted sesame seeds are mixed with 40 parts by weight ground roasted peanuts, 8 parts by weight aqueous Type N Polydextrose (Pfizer Chemical, New York, N.Y.), 14 parts by weight Maltodextrose (Maltrin ® M-100, Grain Processing Corp. Muscatine Iowa), and 14 parts by weight safflower oil at room temperature under low shear mixing conditions until a smooth, spreadable, homogeneous, gravitationally-stabilized sesame flavored spread composition is produced. It is estimated that this composition contains 15.4% protein, 47.4% fat, 25.6% carbohydrate, 2.2% ash, 3.6% water including 2.4% added water, and 5.6% polydextrose.

The invention has been described with reference to various specific and preferred embodiments and techniques. However, it should be understood that many variations and modifications may be made while remaining within the spirit and scope of the present invention.

What is claimed is:

1. A gravitationally-stabilized peanut-containing composition comprising:
   (a) about 25–98% by weight of ground peanuts;
   (b) about 1–50% by weight of water-soluble, edible polydextrose; and
   (c) about 0.5–25% by weight of added water; wherein said polydextrose includes polycarboxylic acid cross-linking agents, wherein said polydextrose is dissolved in said water, and wherein said composition is a gravitationally-stabilized, pumpable, homogeneous mixture.

2. The composition of claim 1, said mixture being compatible with aqueous food systems.

3. The composition of claim 1 wherein said composition is formed by a process comprising combining ground peanuts with an aqueous solution including polydextrose.

4. The composition of claim 1 wherein said composition further comprises about 0.1–10% by weight of edible adjuvants, such as sugar, sugar substitutes, salt, salt substitutes, preservatives, antioxidants, coloring agents, flavoring agents, flavoring adjuncts, flavor enhancers, or mixtures thereof.

5. The composition of claim 1, wherein the polydextrose is a water-soluble, cross-linked, polydextrose, wherein the polydextrose has a number average molecular weight about 1,500–18,000.

6. The composition of claim 1, said ground peanuts including proteinaceous peanut solids and peanut oil, said peanut solids and said peanut oil being derived separately from peanuts.

7. The composition of claim 1 including about 0.1–60% by weight of edible proteinaceous plant solids, said plant solids including plant solids derived from seeds, nuts, or legumes other than peanuts, or mixtures thereof.

8. The composition of claim 1 including about 0.1–60% by weight of edible fats.

9. The composition of claim 8, said edible fats including fats derived from plant sources other than peanuts.

10. The composition of claim 9 including edible fats derived from plants sources other than peanuts selected from the group consisting of seeds, nuts and legumes.

11. The composition of claim 8 including synthetic sugar-fatty acid polyesters in the place of a portion or all of said fats.

12. The composition of claim 11 wherein said synthetic polyester is a substantially calorie-free synthetic sugar-fatty acid polymer having sugar-fatty acid ester linkages.

13. The composition of claim 1 including about 0.1–20% by weight of carbohydrate constituents approved for use in foods selected from the group consisting of bulking agents, stabilizers, suspending agents, thickeners, gelling agents, and mixtures thereof.

14. The composition of claim 13, said carbohydrate constituents including constituents approved for use in foods selected from the group consisting of glycerin, methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, propylene glycols, locust bean gum, methyl ethyl cellulose, maltodextrose, pectin, polysorbates, poloxamers, edible alcohols, tragacanth, and mixtures thereof.

15. The composition of claim 1 including about 0.1–30% by weight of food grade polyhydric alcohol selected from the group consisting of glucose, fructose, sucrose, mannose, dextrose, sorbitol, mannitol, invert sugar and mixtures thereof.

16. A gravitationally-stabilized lipophilic peanut-containing composition comprising:
   (a) about 25–98% by weight of ground peanuts;
   (b) about 1–10% by weight of water-soluble, edible polydextrose; and
   (c) about 0.2–10% by weight of added water; wherein said polydextrose includes polycarboxylic acid cross-linking agents, wherein said polydextrose is dissolved in said water, and wherein said composition is a lipophilic, gravitationally-stabilized, pumpable, homogeneous mixture.

17. The composition of claim 16 wherein said composition is formed by a process comprising combining ground peanuts with an aqueous solution including polydextrose.

18. The composition of claim 16, wherein the polydextrose has a molecular weight of about 1,500–18,000.

19. The composition of claim 16, wherein said composition further comprises about 0.1–5% of edible adjuvants, such as sugar, sugar substitutes, salt, salt substitutes, preservatives, antioxidants, flavor enhancers, flavoring agents, flavoring adjuncts, coloring agents, or mixtures thereof.

20. The composition of claim 16, said ground peanuts including proteinaceous peanut solids and peanut oil, said peanut solids and said peanut oil being derived separately from peanuts.

21. The composition of claim 16 including about 0.1–60% by weight of edible proteinaceous plant solids, said plant solids including plant solids derived from seeds, nuts, or legumes other than peanuts, or mixtures therefrom.

22. The composition of claim 16 including about 0.1–60% by weight of fats.

23. The composition of claim 22, said edible fats including lipids derived from plant sources other than peanuts.

24. The composition of claim 23 including fats derived from plants sources other than peanuts selected from the group consisting of seeds, nuts and legumes.

25. The composition of claim 22 including a synthetic sugar-fatty acid polyester in the place of a portion or all of said fats.

26. The composition of claim 25 wherein said synthetic polyester is a substantially calorie-free, synthetic, sugar-fatty acid polymer having sugar-fatty acid ester linkages.

27. The composition of claim 16 including about 0.1–20% by weight of carbohydrate constituents approved for use in foods selected from the group consisting of bulking agents, stabilizers suspending agents, thickeners, gelling agents, and mixtures thereof.

28. The composition of claim 27 wherein said carbohydrate constituents include constituents approved for use in foods selected from the group consisting of glycerin, methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, propylene glycols, locust bean gum, methyl ethyl cellulose, maltodextrose, pectin, polysorbates, poloxamers, edible alcoholds, tragacanth, and mixtures thereof.

29. The composition of claim 16 including about 0.1–10% by weight of food grade polyhydric alcohol selected from the group consisting of glucose, fructose, sucrose, mannose, dextrose, sorbitol, mannitol, invert sugars, and mixtures thereof.

30. A gravitationally-stabilized, lipophilic, peanut-containing composition prepared by a process comprising:
(a) combining an aqueous solution comprising about 40–80% by weight of water-soluble, edible polydextrose with ground peanuts; and
(b) mixing said aqueous polydextrose solution and said peanuts to yield a pumpable, homogeneous, hydrophilic composition comprising about 25–75% by weight of ground peanuts, about 10–60% by weight of polydextrose, and about 2–30% by weight of added water, wherein said polydextrose includes polycarboxylic acid cross-linking agents, and wherein said polydextrose is dissolved in said water;
(c) combining said pumpable, homogeneous, hydrophilic composition with ground peanuts; and
(d) mixing said homogeneous, hydrophilic composition and said peanuts to yield a pumpable, homogeneous, gravitationally-stabilized, lipophilic composition comprising about 25–98% by weight of ground peanuts, about 1–20% by weight of polydextrose, and about 0.2–10% by weight of added water.

31. The composition of claim 30, wherein about 0.1–20% by weight of edible adjuvants, including sugar, sugar substitutes, salt, salt substitutes, preservatives, antioxidants, coloring agents, flavoring agents, flavoring adjuncts, flavor enhancers, or mixtures thereof, are combined with said aqueous polydextrose solution and said ground peanuts in step (a), and wherein said homogeneous hydrophilic composition comprises about 0.1–20% by weight of said adjuvants.

32. The lipophilic composition of claim 30 wherein about 0.1–10% by weight of edible adjuvants, such as sugar, sugar substitutes, salt, salt substitutes, preservatives, antioxidants, coloring agents, flavoring agents, flavoring adjuncts, flavor enhancers, or mixtures thereof, are combined with said homogeneous hydrophilic composition and said ground peanuts in step (c), and wherein said lipophilic composition comprises about 0.1–10% by weight of said adjuvants.

33. A method of gravitationally-stabilizing a lipophilic, peanut-containing composition, said method comprising the steps of:
(a) combining an aqueous solution comprising about 40–80% by weight of polydextrose with ground peanuts;
(b) mixing said aqueous solution and said ground peanuts to obtain a pumpable, homogeneous, hydrophilic peanut-containing composition comprising about 25–75% by weight of ground peanuts, about 10–60% by weight of polydextrose, and about 2–30% by weight of added water, wherein said polydextrose includes polycarboxylic acid cross-linking agents, and wherein said polydextrose is dissolved in said water;
(c) combining said hydrophilic composition with ground peanuts; and
(d) mixing said hydrophilic composition and said peanuts to yield a homogeneous, gravitationally-stabilized, lipophilic composition comprising a mixture of about 25–98% by weight of ground peanuts, about 1–20% by weight of polydextrose, and about 0.2–10% by weight of added water; wherein about 1.0–25% of the ground peanuts in said lipophilic composition are combined with said aqueous solution in step (a).

34. A gravitationally-stabilized protein-containing composition comprising:
(a) about 5–40% by weight of plant proteins;
(b) about 5–60% by weight fats;
(c) about 2–30% by weight carbohydrates;
(d) about 1–50% by weight polydextrose; and
(e) about 0.5–25% by weight added water; wherein said composition is a gravitationally-stabilized, pumpable, homogeneous mixture, said mixture being compatible with aqueous food systems, wherein said polydextrose includes polycarboxylic acid cross-linking agents, and wherein said polydextrose is dissolved in said water.

35. The composition is claim 34 wherein the polydextrose has a molecular weight of about 1,500–18,000.

36. The composition of claim 34, wherein said composition further comprises about 0.1–5% by weight of adjuvants such as salt, salt substitutes, coloring agents, flavoring agent,, flavoring adjuncts, flavor enhancers or mixtures thereof.

37. The composition of claim 34, wherein the polydextrose is a water-soluble, cross-linked, polydextrose, wherein the polydextrose has a number average molecular weight about 1,500–18,000.

38. The composition of claim 34 wherein said proteins include proteins from nut or legume sources, or mixtures thereof; and wherein said fats include fats from plant sources.

39. The composition of claim 38, wherein said fats include fats from nut or legume sources, or mixtures thereof.

40. The composition of claim 38 wherein said proteins include peanut proteins.

41. The composition of claim 39 wherein said fats include fats from peanuts.

42. The composition of claim 34 including about 1–40% by weight of a synthetic polymer fat substitute.

43. The composition of claim 42 wherein said fat substitute includes an essentially caloric-free ester-linked sugar polymer.

44. The composition of claim 34 wherein said carbohydrates include carbohydrates from plant sources.

45. The composition of claim 34 wherein said carbohydrates include sugars selected from the group consisting of glucose, fructose, sucrose, mannose, dextrose, sorbitol, mannitol, invert sugar, and mixtures thereof.

46. The composition of claim 34 wherein said carbohydrates include constituents approved for use in foods selected from the group consisting of bulking agents, stabilizers, suspending agents, thickeners, and gelling agents.

47. The composition of claim 46 wherein said carbohydrate constituents include constituents approved for use in foods selected from the group consisting of glycerin, methylcellulose, carboxymethylcellulose, xanthan gum, acacia, agar, alginates, carrageenans, starch, modified food starch, guar gum, hydroxpropyl cellulose, hydroxypropyl methyl cellulose, karaya gum, propylene glycols, locust bean gum, methyl ethyl cellulose, maltodextrose, pectin, edible alcohols, polysorbates, poloxamers, and tragacanth.

48. A method of gravitationally-stabilizing a protein-containing composition including about 5–40% by weight plant proteins; about 5–60% by weight fats, and about 2–30% by weight carbohydrates, said method comprising admixing an aqueous solution including food grade polydextrose with the lipophilic protein-containing composition such that said composition is a gravitationally-stabilized, pumpable, homogeneous mixture; wherein said mixture includes about 1–50% by weight polydextrose and about 0.5–25% by weight added water; wherein said plant proteins include proteins from nuts, legumes, or a combination thereof; wherein said polydextrose includes polycarboxylic acid cross-linking agents, and wherein said polydextrose is dissolved in said water.

49. A gravitationally-stabilized predominantly lipophilic protein-containing composition comprising:

(a) about 10–60% by weight of plant proteins;
(b) about 5–70% by weight fats;
(c) about 2–40% by weight carbohydrates;
(d) about 1–20% by weight polydextrose; and
(e) about 0.2–10% by weight added water; wherein said composition is a gravitationally-stabilized, pumpable, homogeneous mixture, wherein said polydextrose includes polycarboxylic acid cross-linking agents, and wherein said polydextrose is dissolved in said water.

50. The composition of claim 49 wherein said composition further comprises about 0.1–10% by weight of adjuvants such as salt, salt substitutes, preservatives, coloring agents, flavoring agents, flavoring adjuncts, flavor enhancers or mixtures thereof.

51. The composition of claim 49 wherein said proteins include proteins from nut of legume sources, or mixtures thereof; and wherein said fats include fats from plant sources.

52. The composition of claim 51 wherein said fats include fats from nut or legume sources, or mixtures thereof.

53. The composition of claim 51 wherein said proteins include peanut proteins.

54. The composition of claim 53 wherein said fats include fats from peanuts.

55. The composition of claim 49 wherein said carbohydrates include carbohydrates from plant sources.

56. The composition of claim 49 wherein said carbohydrates include sugars or edible alcohols selected from the group consisting of glucose, fructose, sucrose, mannose, dextrose, sorbitol, mannitol, invert sugar, and mixtures thereof.

57. The composition of claim 49 wherein said carbohydrates include constituents approved for use in foods selected from the group consisting of bulking agents, stabilizers, suspending agents, thickeners, and gelling agents.

58. The composition of claim 57 wherein said carbohydrate constituents include constituents approved for use in foods selected from the group consisting of glycerin, methylcellulose, carboxymethylcellulose, xanthan gum, acacia, agar, alginates, carrageenans, starch, modified food starch, guar gum, hydroxypropyl cellulose, hydroxypropyl methyl cellulose, karaya gum, propylene glycols, locust bean gum, methyl ethyl cellulose, maltodextrose, pectin, edible alcohols, polysorbates, poloxamers, and tragacanth.

59. A method of gravitationally-stabilizing a predominantly lipophilic protein-containing composition including about 10–60% by weight plant proteins; about 5–70% by weight fats; and about 2–40% by weight carbohydrates, said method comprising admixing an aqueous solution including edible polydextrose with the lipophilic protein-containing composition such that said composition is a lipophilic, gravitationally-stabilized, pumpable, homogeneous mixture; wherein said mixture includes about 1–20% by weight polydextrose and about 0.2–10% by weight added water; wherein said plant proteins include proteins from nuts, legumes, or a combination thereof; and wherein the polydextrose is dissolved in said water.

* * * * *

UNITED STATES PATENT AND TRADEMARK OFFICE
CERTIFICATE OF CORRECTION

PATENT NO. : 4,832,977
DATED : May 23, 1989
INVENTOR(S) : F. Lee Avera

It is certified that error appears in the above-identified patent and that said Letters Patent is hereby corrected as shown below:

In col. 4, line 16, "weigh" should be --weight--.

In col. 7, line 13, "intrainment" should be --entertainment--.

In col. 7, line 46, after "amount" insert --of--.

In col. 8, line 23, "proteinaceious" should be --proteinaceous--.

In col. 10, line 37, "non-utritive" should be --non-nutritive--.

In col. 13, lines 25 and 42, "homogenous" should be --homogeneous--.

In col. 14, line 19, "then" should be --the--.

In col. 15, line 19, "lipophlic" should be --lipophilic--.

In col. 16, line 43, "on" should be --one--.

In col. 16, line 52, "homogenous" should be --homogeneous--.

In col. 16, line 66, after "protein" change period to comma.

UNITED STATES PATENT AND TRADEMARK OFFICE
CERTIFICATE OF CORRECTION

PATENT NO. : 4,832,977
DATED : May 23, 1989
INVENTOR(S) : F. Lee Avera

It is certified that error appears in the above-identified patent and that said Letters Patent is hereby corrected as shown below:

In col. 17, line 42, "teen" should be --then--.

In col. 17, line 47, "7020C." should be --70°C.--.

In col. 18, line 61, after "Corp." insert comma.

In col 19, line 7, "homogenous" should be --homogeneous--.

In col. 20, line 8, after "weight" insert --of--.

In col. 21, line 48, "alcoholds" should be --alcohols--.

In col. 22, line 67, "is" should be --of--.

In col. 23, line 4, "agent,," should be --agents,--.

In col. 23, line 9, after "weight" insert --of--.

In col. 23, line 42, "hydroxpropyl" should be --hydroxypropyl--.

In col 24, line 2, insert a space after "about".

Signed and Sealed this

Seventh Day of May, 1991

*Attest:*

*Attesting Officer*

HARRY F. MANBECK. JR.

Commissioner of Patents and Trademarks